B. R. HAGAR.
COMBINATION UNION FOR WROUGHT-IRON PIPE.

No. 179,698. Patented July 11, 1876.

Witnesses;
A. M. King
Hark E. Bailey

Inventor;
Benjamin R. Hagar

UNITED STATES PATENT OFFICE.

BENJAMIN R. HAGAR, OF ANTWERP, NEW YORK.

IMPROVEMENT IN COMBINATION UNIONS FOR WROUGHT-IRON PIPES.

Specification forming part of Letters Patent No. 179,698, dated July 11, 1876; application filed March 27, 1876.

*To all whom it may concern:*

Be it known that I, BENJAMIN R. HAGAR, of Antwerp, in the county of Jefferson, State of New York, have invented a new and valuable Improvement in a Combination Union for Wrought-Iron Pipe; and I do hereby declare that the following is a full, clear, and exact description of the construction and operation of the same, reference being had to the annexed drawings, making a part of this specification, and to the letters and figures of reference marked thereon.

Figure 1:
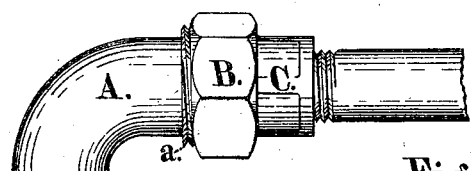
Figure 2:
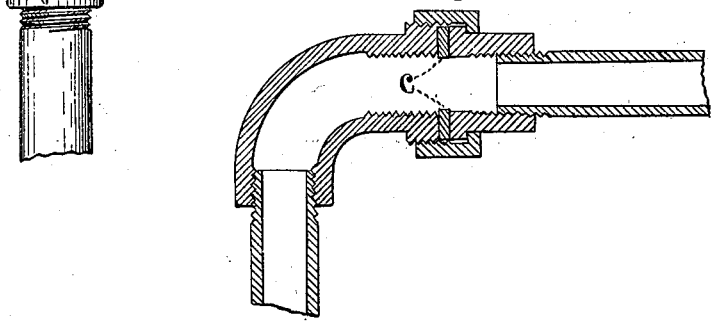
Figure 3:
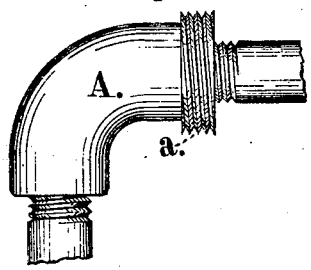
Figure 4:
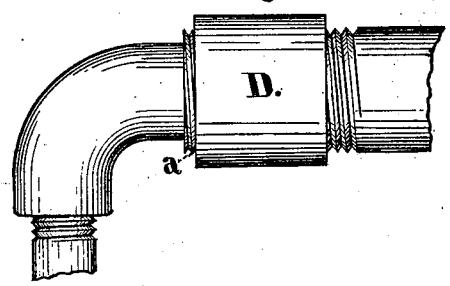
Figure 5:
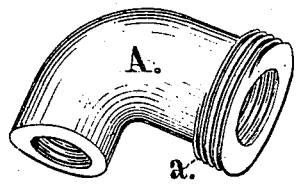
Figure 5:
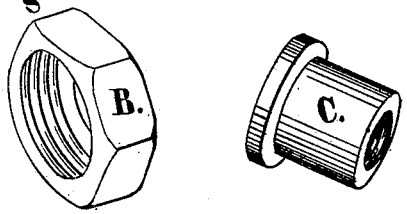

Figure 1 of the drawing represents a side view thereof, with pipe-connections. Fig. 2 represents a central section thereof. Fig. 3 represents the fitting making an ordinary connection without the union. Fig. 4 represents the fitting used as a bushing or reducer, making connection from a larger to a smaller sized pipe. Fig. 5 represents a detailed view of same in perspective.

This invention has relation to means for connecting the angular tubes, termed "gas, water, and steam pipe fittings," commonly known as L's, T's, Y's, +'s, &c., to iron pipe; and it consists in forming on the external portion of one or more of the limbs of an angular fitting, a screw-threaded enlargement, in combination with internal thread, whereby a pipe can be applied internally, making the ordinary connection; or a nut-ring, slipped over the flanged end of an ordinary union, can be screwed on the enlarged thread, and with a packing make a perfect joint, thereby doing away with the use of a nipple and the one-half of an ordinary union.

The advantages gained by the use of this combination union are, first, it is much cheaper; second, the diminished space it occupies, which at times is of great importance; third, the time and labor saved in making pipe-connections by the use of it; fourth, in making pipe-connections, should it be necessary to change from one size pipe to another, the fitting can be used separately, the enlarged thread being so constructed that it will screw into the coupling or thimble of a larger size pipe, thereby saving the expense of a bushing or reducer and nipple, also the space that would be occupied by them.

There are other advantages of the screw-threaded enlargement on pipe-fittings, which those engaged in this line of business will readily perceive, as it is equally applicable to globe-valves, check-valves, stop-cocks, &c.

In the annexed drawing, Figure 1 represents an L, A, with the internal surfaces of each end being screw-threaded in the usual manner to receive the ends of gas, steam, or water pipe, as shown by the limb $b$. The other limb has an enlargement, $a$, on which is cut a screw-thread, which is constructed to receive the nut-ring B. The same ring also receives the flanged tube C. Between the tube C and L A is placed a washer or packing, and the nut-ring B then being screwed on the enlargement $a$ forms a tight union. Fig. 2 represents a cross-section of the same, C showing the packing in use. Fig. 3 represents the L A, making a pipe-connection in the ordinary manner. Fig. 4 represents the L A used as a reducer, D being the coupling of a three-quarter ($\frac{3}{4}$) inch pipe, into which is screwed the enlarged end $a$ of a one-quarter ($\frac{1}{4}$) inch elbow. Into the other limb of the L is inserted a one-quarter ($\frac{1}{4}$) inch pipe. Fig. 5 represents a perspective view of the elbow A, showing the internal threads with the external threaded enlargement, the nut-ring B, and the flanged tube C.

What I claim as my invention, and desire to secure by Letters Patent, is—

The elbows, T's, or their equivalents, constructed with one or more of their branches enlarged and screw-threaded, in combination with the nut-ring B and flanged tube C, as herein substantially described.

BENJAMIN R. HAGAR.

Witnesses:
A. M. KING,
CLARK E. BAILEY.